E. M. TINGLEY.
COIL SUPPORT FOR DYNAMO ELECTRIC MACHINERY.
APPLICATION FILED APR. 10, 1905.
1,007,617.
Patented Oct. 31, 1911.
2 SHEETS—SHEET 1.
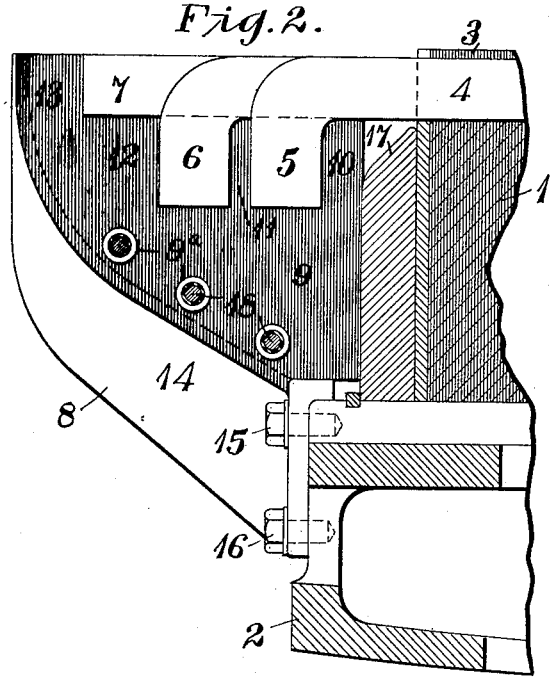
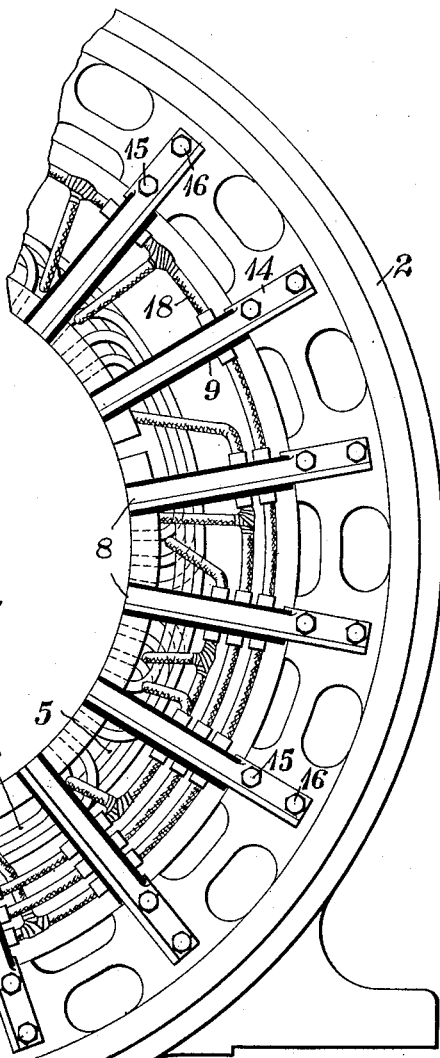
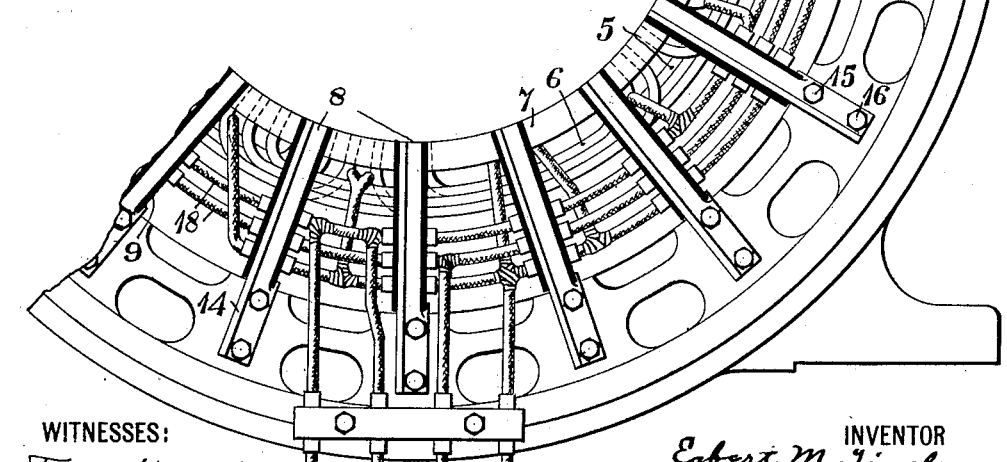
WITNESSES:
Fred H. Miller
R. J. Dearborn
INVENTOR
Egbert M. Tingley
BY
Wesley G. Carr
ATTORNEY E. M. TINGLEY.
COIL SUPPORT FOR DYNAMO ELECTRIC MACHINERY.
APPLICATION FILED APR. 10, 1905.
1,007,617.
Patented Oct. 31, 1911.
2 SHEETS—SHEET 2.
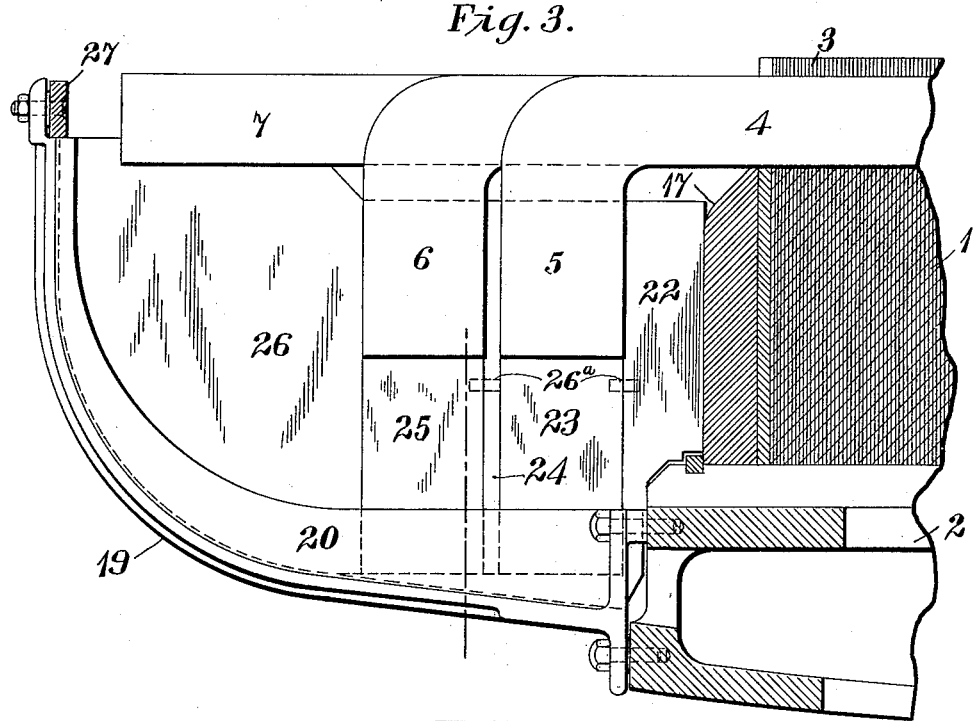
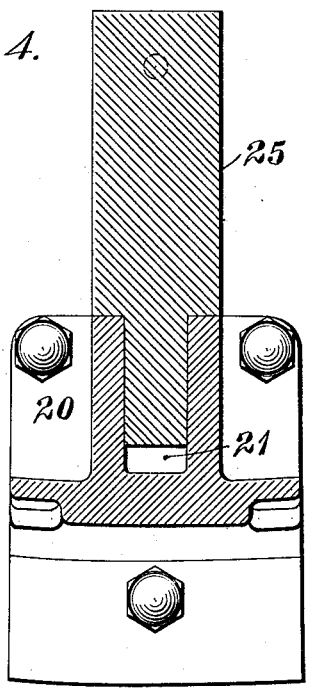
WITNESSES:
Fred. H. Miller
R. J. Dearborn
INVENTOR
Egbert M. Tingley
BY
Wesley G. Carr
ATTORNEY

UNITED STATES PATENT OFFICE.

EGBERT M. TINGLEY, OF PITTSBURGH, PENNSYLVANIA, ASSIGNOR TO WESTINGHOUSE ELECTRIC & MANUFACTURING COMPANY, A CORPORATION OF PENNSYLVANIA.

COIL-SUPPORT FOR DYNAMO-ELECTRIC MACHINERY.

1,007,617. Specification of Letters Patent. Patented Oct. 31, 1911.

Application filed April 10, 1905. Serial No. 254,776.

*To all whom it may concern:*

Be it known that I, EGBERT M. TINGLEY, a citizen of the United States, and a resident of Pittsburgh, in the county of Allegheny and State of Pennsylvania, have invented a new and useful Improvement in Coil-Supports for Dynamo-Electric Machinery, of which the following is a specification.

My invention relates to dynamo-electric machines and particularly to supporting means for the coils of stationary armatures.

The object of my invention is to provide means for the support of armature coils which shall effectually prevent warping or displacement of the coils under mechanical and electro-magnetic strains and which shall maintain a high degree of insulation.

Tests have shown that the portions of armature coils which are not included in the core slots may be subjected to enormous strains which tend to violently distort the coils and inflict serious damage to them in case the armature is short-circuited. This distortion may be explained as the reaction, upon each other, of stray magnetic fields which are set up by the excessive short-circuited electric currents in different sets of armature coils, since the tendency is apparently greatest in machines having comparatively few poles, and in which the ampere turns are concentrated in a small number of groups, such as high speed turbo-generators. The explanation included herein is not set forth as necessarily stating the correct reason for the coil distortion but is merely intended to present a reasonable theory for what takes place when coils that are not properly supported are short-circuited.

In order to meet the above specified conditions I have devised supports which have such form and arrangement and are so combined with the armature frame, core and winding as to successfully resist all tendency to displacement of said winding, or any part thereof, in any direction.

My invention is illustrated in the accompanying drawings in which—

Figure 1 is a partial end elevation of a stationary armature, equipped with coil supports constructed in accordance therewith and Fig. 2 is a partial section through the armature core which further discloses one of the coil supports shown in Fig. 1. Fig. 3 is a partial section through the armature core which discloses a modified form of support in which the supporting brackets form part of the end bell construction, and the insulating block is composed of a plurality of segments, and Fig. 4 is a cross-section through the bracket of Fig. 3.

Referring to Figs. 1 and 2, an armature core 1 is supported by a frame 2 and is provided with a plurality of slots 3 in which a winding 4 is placed. The conductors in each slot are insulated from each other and may be bound together in the usual manner.

The windings of stationary, polyphase armatures involve some special disposition of the end connections of the winding since the windings of one phase overlap the windings of another phase; that is, if one phase winding is considered as the main winding, the other phase windings may be considered as interpolar windings. In order to avoid interference of the end connections it is usual to bend the coils away from the center of the core and let the end connections follow the path of a circle concentric with the core face and slightly farther from the center than the bottoms of the slots. The coils from the interpolar slots may then be carried out in straight lines until the first set are avoided and then take a similar form in a plane more distant from the frame. In the same way all the windings of different phases which are included within the first polar winding may be successively carried out and bent away from the center. However, it is obviously unnecessary to bend down the last set so that the end connections often follow the path of a circle concentric with that of the core face and of substantially equal radius.

The winding illustrated in the accompanying drawing is a three-phase winding and has, for every pole, two coils 5 and 6 that are bent away from the core center after leaving the slots and one straight coil 7. A coil support 8, comprising an insulating block 9 which is provided with projections 10, 11, 12 and 13 and a metal bracket 14 which holds the block 9 in position and which is itself bolted to the frame 2 by bolts 15 and 16, supports that portion of the winding which is external to the slots 3. The projections 10, 11, 12 and 13 are arranged to act as spacing blocks, the projection 10, being located between the end plate 17 of the core and the coil 5, the projection 11 between the coils 5 and 6, the projection 12 being fitted between coils 6 and 7, the projection 13 being fitted against one end of coil 7. The block 9 may be provided with a plurality of holes 9ª to receive and support conductors 18 that serve as cross-connections between points in the armature winding.

Referring to Figs. 3 and 4, a coil support 19 of slightly different construction, comprises a supporting bracket 20 which is provided with a groove 21 into which a plurality of insulating block segments 22, 23, 24, 25 and 26 are fitted. The groove 21 is relatively deep so that the block segments may be firmly supported. The block segments 22, 23, 24, 25 and 26 are arranged to insulate and support the end connections of the armature winding, segment 22 being located between the end plate 17 of the core and the coil 5, the segment 23 fitting against one end of the coil 5, the segment 24 being located between the coils 5 and 6, the segment 25 fitting against one end of the coil 6 and the segment 26 fitting against the coils 6 and 7. The several segments of the block may be pinned together by a plurality of dowel pins 26ª so that they form a rigid spacing block that is operatively the same as the block shown in Fig. 2 but is more easily fitted to the windings because of its segmental structure. The supporting brackets are connected by a ring 27 to which the several segments of the end bell are bolted, a rigid structure being thus provided.

Although the coil support of my invention is illustrated for convenience in connection with a specific arrangement of armature coils, I desire it to be understood that any changes in the arrangement of the coils or in the size or shape of the support which do not materially alter the purpose or the results obtained, are within the scope of my invention. I desire it to be further understood that my invention may be utilized in connection with either direct or alternating current generators or motors and for supporting the windings of either stationary or movable machine members provided the structural and operative conditions warrant such use.

I claim as my invention:

1. In a dynamo-electric machine, the combination with a slotted magnetizable core, a supporting frame therefor, and a winding, portions of which project beyond the core slots, of a series of insulating blocks having integral projections that fit around and between the coil ends and supporting brackets for said blocks.

2. In a dynamo-electric machine, the combination with a slotted, magnetizable core, a supporting frame therefor, and a winding, portions of which project beyond the core slots into different planes, of a plurality of insulating blocks having integral projections that fit around and between the coil ends and a plurality of bracket frames which are rigidly fastened to said supporting frame.

3. In a dynamo-electric machine, the combination with a magnetizable core, a supporting frame therefor and a winding partially included in a plurality of slots in said core, that portion of said winding which is external to said slots comprising a plurality of end connectors which are concentric with said core, of means for supporting said end connectors, that comprises a plurality of notched spacing blocks and a series of brackets which are clamped to said core frame.

4. In a dynamo-electric machine, the combination with a slotted, magnetizable core, a supporting frame therefor, and a winding, the coils of which are partially located in the core slots and project beyond the ends of the core into different planes and different arcs, of a series of insulating blocks having notches and projections which fit between and around the projecting ends of the coils and corresponding supporting brackets which are fastened to the core frame.

5. In a dynamo-electric machine, the combination with a slotted, magnetizable core, a supporting frame therefor, and a winding comprising coils which are located partially in and project beyond the ends of the core slots and the projecting ends of which are connected by curved portions which are located in different planes, of means for supporting said end portions and for maintaining them in suitable insulated relation to each other, which comprise a plurality of insulating blocks, equally spaced around the core and provided with notches and projections to fit around and between the end portions of the coils, supporting brackets for said blocks and means for fastening the brackets to the core frame.

6. In a dynamo-electric machine, the combination with a slotted, magnetizable core, a supporting frame therefor, and a winding, the coils of which project through and beyond the core slots, of a plurality of notched, insulating blocks, which are radially disposed around the core and are notched to fit between and around the projecting ends of the coils, supporting brackets for said blocks and means for fastening the same to the core frame.

7. In a dynamo-electric machine, the combination with a slotted, magnetizable core, a supporting frame therefor, and a winding, the coils of which project through the core slots and beyond the ends of the same, of a series of insulating blocks, which are equally spaced and radially disposed around the core and are notched to fit between and around the projecting ends of the coils, and metal brackets which severally support said blocks and are fastened to the core frame.

8. A coil support, comprising a notched, insulating spacing block, comprising a plurality of segments, a suitable supporting bracket therefor, and means for fastening said bracket to a rigid body.

9. In a dynamo-electric machine, the combination with a slotted, magnetizable core, a supporting frame therefor, and a winding, portions of which project beyond the core slots into different planes, of a series of insulating blocks severally composed of a plurality of segments that fit around and between the coil ends, and a series of bracket frames which are rigidly fastened to said supporting frame.

10. In a dynamo-electric machine, the combination with a slotted, magnetizable core, a supporting frame therefor, and a winding, portions of which project beyond the core slots, of a series of supports for the projecting portions of said winding, that severally comprise a plurality of insulating block segments, which fit around and between the coil ends, and supporting brackets therefor that are grooved to receive said segments.

11. In a dynamo-electric machine, the combination with a slotted core, a frame therefor, and a winding that projects beyond the ends of the core slots into different planes, of a series of brackets uniformly spaced around the core frame, and a multi-part insulating block for each bracket, the parts of which fit between and around the coil ends, and are fastened together by dowel pins.

12. In a dynamo-electric machine, the combination with a core and its coils, of an annular set of supports for the projecting ends of the coils each of which comprises a bracket and an insulating block having projections that fit between and against the coil-ends.

13. In a dynamo-electric machine, the combination with a core and its coils, of an annularly disposed set of supports each of which comprises a bracket and a segmental block having projections that fit between and against the coil-ends.

In testimony whereof, I have hereunto subscribed my name this 8th day of April, 1905.

EGBERT M. TINGLEY.

Witnesses:
M. STELLA FLEISHER,
BIRNEY HINES.

---

Copies of this patent may be obtained for five cents each, by addressing the "Commissioner of Patents, Washington, D. C."